July 16, 1963

O. M. KELLNER 3,097,443

CHANGEABLE FRAMES FOR DIAPOSITIVES

Filed Feb. 25, 1960

INVENTOR.
OSKAR KELLNER
BY
Mestern & Kollin
ATTORNEYS

United States Patent Office 3,097,443
Patented July 16, 1963

3,097,443
CHANGEABLE FRAMES FOR DIAPOSITIVES
Oskar Maria Kellner, Neusaesser Strasse 25,
Augsburg, Germany
Filed Feb. 25, 1960, Ser. No. 11,070
3 Claims. (Cl. 40—152)

The invention relates to synthetic material change frames consisting of two frame portions for the mounting of film pictures disposed between transparent plates in which each frame portion has a setting for a plate cut so as to fit it.

According to the present invention, a non-metallic change frame consisting of two frame portions for the mounting of film pictures disposed between transparent plates, each frame portion having a setting for an appropriately cut plate, is characterized in that the plates with the frame portions are adapted to form a unitary body of such configuration that the edge of the plate is positively at least at one location.

If several connection elements are provided it is recommended that each of these elements of one frame portion be disposed offset from the corresponding elements of the other frame portion so that, on folding together of the two frame portions, these connection elements do not block one another.

In this manner it is not necessary for a shopkeeper to occupy himself with the mounting of the cover glasses inside the frame portions. The plates may, however, also be inserted into the completed frames and thereafter, if desired, replaced by other plates.

At least the connection elements of the upper surface may project over the plates inserted in the setting so that between the upper surface of these plates and the adjoining surface of the film picture a clearance is formed which prevents contact between the surfaces. It is thus possible in this simple way to avoid to a substantial extent the disadvantageous formation of Newton's rings associated with known projection-slide frames.

The individual frame portions may have separate connecting pegs for the indirect or direct positive retention of the inserted film picture. In this case, therefore, not only the individual cover glass but also the film picture or a separate insert carrying the film picture is held positively within the slide frame so that it is easy to carry out the insertion of the film picture, without the cover plate or the film picture having to be soiled with the fingers.

The invention will be described further, by way of example, with reference to the accompanying drawing in which.

Figure 1:
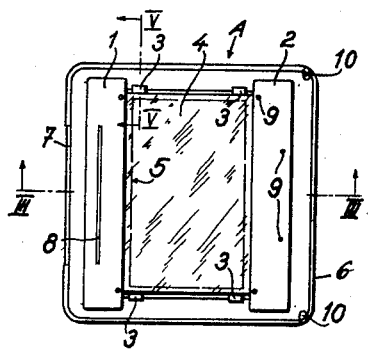
FIG. 1 is a schematic plan view of a lower portion of a frame constructed in accordance with the invention.
Figure 2:
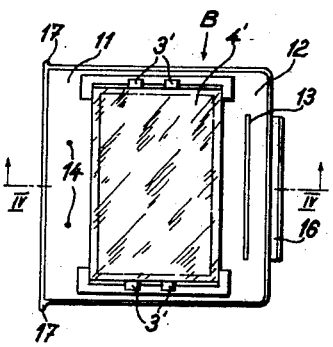
FIG. 2 is a schematic plan view of an upper portion of the same frame.
Figure 3:
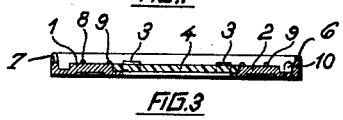
FIG. 3 is a cross-section corresponding to FIG. 1.
Figure 4:
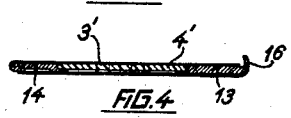
FIG. 4 is a cross-section corresponding to FIG. 2.

FIG. 1 shows a lower portion A of one embodiment of a slide frame. A cover plate 4 consisting of silicate glass or glass clear synthetic material is positioned between ledges 1 and 2 and held positively by means of the cleats 3 which constitute one set of retaining elements. The surface of the ledges 1 and 2 and that of the cleats 3, or at least the latter, as shown in FIG. 3, project somewhat above the surface of the cover plate 4 in order to form a clearance between the film picture 15 (FIG. 13), resting on the cleats or the ledges 1 and 2, and the surface of the plate 4, which prevents the production of Newton's rings during projection. The edge of the frame portion A is thickened in the form of a web 6, this web-like enlargement being interrupted at a gap 7. A fingerpiece 16 (FIG. 2) of an upper portion B of the frame enters this gap. The film picture (not shown in FIG. 1) is centered between a rib 8 and protuberances 9 or a second rib; these ribs 8 etc. or protuberances 9 may be undercut for the complementary reception of the film picture edges.

Openings 10 in the lower frame portion A are adapted to receive projections 17 of the upper frame portion B (FIG. 2) so as to form a hinge or pivotal joint. The cover glass 4' inserted in the upper portion B is likewise retained with complementary connecting means 3', and it has been found expedient that the cleats 3, 3' of the parts A and B be disposed offset relatively to each other. The centering of the cover glass 4' in the upper portion B is effected by ledges 11 and 12. Those points of the upper portion B which register with the ribs 8 and protuberances 9 of the lower portion A are provided with appropriately fitting recesses at 14 and 13.

Figures 5, 6:
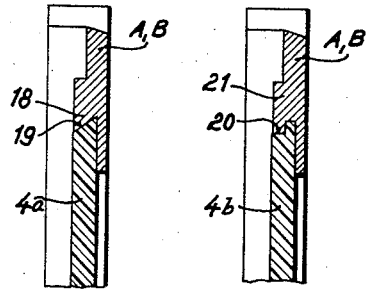
FIGS. 5 and 6 are modified cross-sectional views through the positively acting complementary connection means of the frame portions.

As indicated in FIG. 5 it is preferable to bevel off the edges of the covering plate 4a at which the complementary connection is effected with the frame portions A, B; the frame portions A, B have a parallel undercut 18 corresponding to this bevel 19, the wall of this undercut surrounding it. The cover plate 4 may be inserted into portion A or B which may be heated, whereby an expansion of the ledge portion 1, 2 of the frame portions A, B is effected. When these frame portions A, B cool, the complementary connection elements 18 shrink to engage the edges of the cover plate 4a whereby the positive fitting is attained.

The cover plates 4, 4' may have the individual frame portions with the attachment elements 18 molded around them by compression or injection. In this case it has been found advantageous to heat the cover plates 4, 4' and to insert these into the compression or injection mold so that no cracks can occur in the cover plate 4 upon compression or injection.

As shown in FIG. 6 the edges of the cover plate 4b are stepped at 20 and attachment elements 21 of the frame portions have an appropriately fitting recess.

Figures 8, 9:
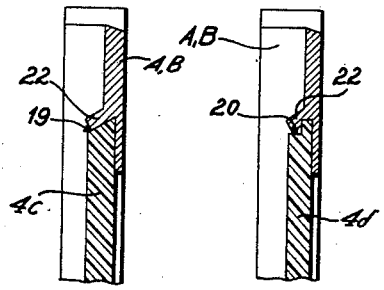

As shown in FIGS. 8 and 9, attachment means 22 may be constructed in such a way that they are crimped around the beveled or bent edges 19 or 20 of the cover plate 4c or 4d. This edging is carried out conveniently in a separate apparatus in which the individual frames A and B are placed with the cover plate 4c or 4d whereupon, by means of a ram plate, the attachment elements 22 are pressed on to the edges 19 and 20.

Figures 10, 11:
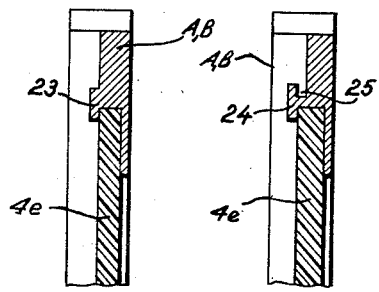
FIGS. 8 to 11 are transverse sections illustrating modifications of embodiments shown in FIGS. 5 and 6.

As shown in FIGS. 10 and 11 the cover plates 4e are engaged around their entire circumference by attachment elements 23 and 24, as is the case shown in FIG. 10, so that the attachment element 23 is molded around the cover plate 4e or in the case shown in FIG. 11 the attachment element 24 is crimped around the cover plate 4e, for which purpose this attachment element 24 has an additional recess 25 which makes this crimping possible.

Figure 7:
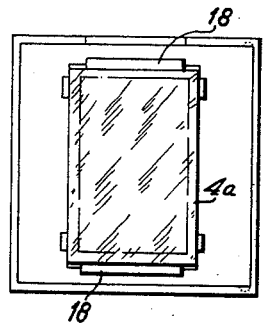
FIGS. 7 and 12 are plan views of modifications of the complementary connection means.
Figure 12:
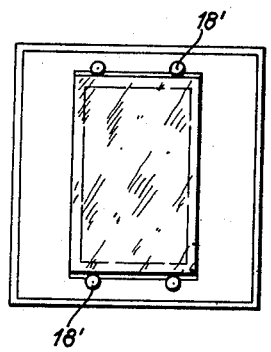
Figure 13:
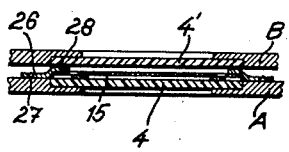
FIG. 13 is a schematic cross-section through a frame with a positively engaged insert therein for the attachment of a film picture.
Figure 14:
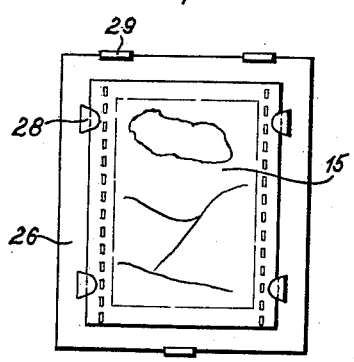
FIGS. 14 and 15 are schematic plan views of inserts of the type shown in FIG. 13.
Figure 15:
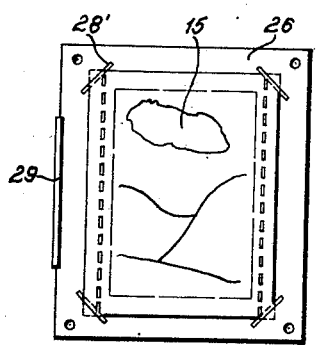

As can be seen from FIGS. 7 and 12 the attachment elements are in the form of ribs 18 and rails or projections 18'; as many ribs or projections 18, 18' may be provided as may be required and may be disposed at any selected positions, insofar and to such an extent that a fixed mounting of the glass 4 is ensured. Separate inserts 26 may be provided as shown in FIGS. 13 to 15 for the attachment of the film picture 15; these inserts, in the case of the embodiment shown in FIG. 13, are centered in dimple-like formation 27 on the lower portion A. The inserts 26 have separate connection members 28 in which the film picture 15 is positively retained.

As shown in FIG. 14 the connection members 28 are formed by stamping in the insert 26 to form flaps beneath which the film picture 15 is firmly tightened.

As shown in FIG. 15 there is the further possibility of providing stamped-in slots 28' in the inserts 26 in which the film pictures 15 are slidable. Rib-like or bar-like connecting means 29 may be provided, instead of the dimple-like centering means 27 shown in FIG. 13, for the attachment of the inserts 26 on the lower portion A of the slide frame, these attachment means 29 having the same function as the retention elements 18 shown in FIG. 5.

If, in the production of color diapositives or slides, it should be found necessary to provide color correction for elimination of color patches or to produce a special color effect, it is preferable to make at least one of the cover plates 4, 4' and 4a–4e colored. These covering plates may consist of homogeneously colored silicate glass or synthetic material and it is possible to provide at least one surface of this cover plate with a color layer. This can be produced by painting, dipping, vapor deposition, application of a gelatine layer or photographic treatment.

I claim:

1. A slide frame comprising a pair of coextensive and hingedly interconnected frame members with aligned openings and with mating edge portions defining a peripherally closed casing in an engaged position of said members; a pair of substantially coextensive transparent plates within said casing respectively spanning said openings; a first set of retaining elements on one of said members overlying opposite marginal zones of one of said plates for holding it in place and so disposed as to come to rest against the other of said plates in the engaged position of said members; and a second set of retaining elements offset from said first retaining elements on the other of said members overlying opposite marginal zones of said other of said plates for holding it in place and so disposed as to come to rest against said one of said plates in said engaged position whereby said plates are held spaced apart with an intervening clearance accommodating a transparency between said plates.

2. A slide frame as defined in claim 1 wherein said first set of retaining elements includes a respective pair thereof relatively closely spaced along each of said marginal zones of said one of said plates and said second set of retaining elements includes a respective pair thereof relatively widely spaced along corresponding marginal zones of said other of said plates outwardly of the retaining elements of said first set.

3. A slide frame as defined in claim 1 wherein said plates are of generally rectangular configuration with each of said sets of retaining elements including at least two elements lying along one pair of opposite sides of the respective plate, said frame members each comprising a pair of positioning ledges extending longitudinally along another pair of opposite sides of the respective plate.

References Cited in the file of this patent

UNITED STATES PATENTS

| | | |
|---|---|---|
| 1,055,453 | Durnan | Mar. 11, 1913 |
| 2,505,250 | Kime | Apr. 25, 1950 |
| 2,837,853 | Bing | June 10, 1958 |
| 2,871,600 | Woodruff | Feb. 3, 1959 |
| 2,889,645 | Thieme | June 9, 1959 |